United States Patent
Hinzmann et al.

(10) Patent No.: US 9,663,622 B2
(45) Date of Patent: May 30, 2017

(54) HYDROXYL-CONTAINING SILICONE-POLYESTER-ACRYLATE BINDER

(71) Applicant: EVONIK DEGUSSA GMBH, Essen (DE)

(72) Inventors: Dirk Hinzmann, Pulheim (DE); Jessica Leyers, Essen (DE); Thomas Klotzbach, Seligenstadt (DE); Bärbel Wolff, Moers (DE); Sascha Herrwerth, Essen (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 14/911,396

(22) PCT Filed: Aug. 25, 2014

(86) PCT No.: PCT/EP2014/067954
§ 371 (c)(1),
(2) Date: Feb. 10, 2016

(87) PCT Pub. No.: WO2015/039837
PCT Pub. Date: Mar. 26, 2015

(65) Prior Publication Data
US 2016/0185918 A1     Jun. 30, 2016

(30) Foreign Application Priority Data

Sep. 20, 2013  (DE) .................. 10 2013 218 976

(51) Int. Cl.
| | | |
|---|---|---|
| C09D 5/00 | (2006.01) | |
| C09D 183/10 | (2006.01) | |
| C08G 77/442 | (2006.01) | |
| C08G 77/445 | (2006.01) | |
| C08G 77/00 | (2006.01) | |

(52) U.S. Cl.
CPC ............ C08G 77/80 (2013.01); C09D 5/00 (2013.01); C09D 183/10 (2013.01)

(58) Field of Classification Search
None
See application file for complete search history.

(56) References Cited

U.S. PATENT DOCUMENTS

| | | | |
|---|---|---|---|
| 4,291,135 A * | 9/1981 | Hohlein ............ | C08G 63/181 427/387 |
| 6,281,321 B1 | 8/2001 | Kelly et al. | |
| 7,361,777 B2 | 4/2008 | Herrwerth et al. | |
| 7,442,666 B2 | 10/2008 | Herrwerth et al. | |
| 7,598,334 B2 | 10/2009 | Ferenz et al. | |
| 7,605,284 B2 | 10/2009 | Brueckner et al. | |
| 7,727,599 B2 | 6/2010 | Doehler et al. | |
| 7,759,402 B2 | 7/2010 | Venzmer et al. | |
| 7,834,122 B2 | 11/2010 | Ferenz et al. | |
| 7,893,128 B2 | 2/2011 | Busch et al. | |
| 7,964,694 B2 | 6/2011 | Ferenz et al. | |
| 8,030,366 B2 | 10/2011 | Ferenz et al. | |
| 8,084,633 B2 | 12/2011 | Herrwerth et al. | |
| 8,172,936 B2 | 5/2012 | Herrwerth et al. | |
| 8,211,972 B2 | 7/2012 | Meyer et al. | |
| 8,466,248 B2 | 6/2013 | Meyer et al. | |
| 8,617,529 B2 | 12/2013 | Herrwerth et al. | |
| 8,685,376 B2 | 4/2014 | Czech et al. | |
| 8,778,319 B2 | 7/2014 | Herrwerth et al. | |
| 8,841,400 B2 | 9/2014 | Henning et al. | |
| 9,138,385 B2 | 9/2015 | Dahl et al. | |
| 2005/0136269 A1 | 6/2005 | Doehler et al. | |
| 2007/0299231 A1 | 12/2007 | Doehler et al. | |
| 2009/0007483 A1 | 1/2009 | Hansel et al. | |
| 2010/0034765 A1 | 2/2010 | Herrwerth et al. | |
| 2010/0210445 A1 | 8/2010 | Von Rymon et al. | |
| 2011/0206623 A1 | 8/2011 | Wenk et al. | |
| 2012/0021960 A1 | 1/2012 | Wenk et al. | |
| 2013/0259821 A1 | 10/2013 | Henning et al. | |
| 2013/0267403 A1 | 10/2013 | Von Rymon et al. | |
| 2013/0331592 A1 | 12/2013 | Hartung et al. | |
| 2015/0073069 A1 | 3/2015 | De Gans et al. | |

FOREIGN PATENT DOCUMENTS

| | | | |
|---|---|---|---|
| DE | 1247823 A2 * | 10/2002 | ............ C08F 283/01 |
| EP | 0006517 A1 | 1/1980 | |
| EP | 0776920 A2 | 6/1997 | |
| EP | 1247823 A2 | 10/2002 | |

OTHER PUBLICATIONS

Machine translation of EP 1247823 A2.*
German language International Search Report mailed on Nov. 18, 2014 in PCT/EP2014/067954 (3 pages).
German language Written Opinion mailed on Nov. 18, 2014 in PCT/EP2014/067954 (5 pages).
International Search Report mailed on Nov. 18, 2014 in PCT/EP2014/067954 (2 pages).
Klotzbach, U.S. Appl. No. 14/906,365, filed Jan. 20, 2016.

* cited by examiner

*Primary Examiner* — Vu A Nguyen
(74) *Attorney, Agent, or Firm* — Philip P. McCann; Smith Moore Leatherwood LLP

(57) ABSTRACT

The present invention relates to a hydroxyl-containing silicone-polyester-acrylate binder, to processes for its preparation and to its use wherein the binder is based on a hydroxy-functional acrylate resin A), an alkoxy- and/or silanol-functional polysiloxane B), one or more dicarboxylic or polycarboxylic acids C) and one or more diols or polyols D), the constituents A) to D) being present condensed with one another in the binder.

20 Claims, No Drawings

HYDROXYL-CONTAINING SILICONE-POLYESTER-ACRYLATE BINDER

This application is a national stage application under 35 U.S.C. §371 of International Application No. PCT/EP2014/067954 filed 25 Aug. 2014, which claims priority to German Application No. DE 10 2013 218 976.1 filed 20 Sep. 2013, the disclosures of which are expressly incorporated herein by reference.

FIELD

The present invention relates to a hydroxyl-containing silicone-polyester-acrylate binder, to processes for its preparation and to its use.

BACKGROUND

Binders for modern coating systems are required to fulfil a multiplicity of requirements. Accordingly they must on the one hand exhibit certain technical coating properties such as scratch resistance, hiding power and weather resistance, while on the other hand good processing qualities, economical preparation, and the fulfilment of statutory impositions are to be ensured.

EP 0006517 describes siloxane-modified binders based on polyacrylate resins and polyesters for the production of coating materials. A disadvantage of the binders described therein is that at sufficiently low VOC levels (Volatile Organic Compound) they frequently no longer possess the desired profile of properties—for example, inadequate weather resistance and also chemical resistance.

EP 1247823 describes solvent-borne binders preparable by polymerization of a polyester component and an acrylate component. A disadvantage of the binders described therein is that owing to excessively high VOC levels it is impossible to realize eco-friendly coatings having a VOC content <250 g/L. Furthermore, binders of this kind with a solids content of more than 75 wt % cannot be prepared, owing to excessive viscosity.

It is an object of the present invention to provide improved binders which can be used in order to provide long-lasting coatings.

The complex object stated above is achieved by binders in accordance with the present invention.

A first subject of the present invention are binders based on a hydroxy-functional acrylate resin A), an alkoxy- and/or silanol-functional polysiloxane B), one or more dicarboxylic or polycarboxylic acids C) and one or more diols or polyols D), the constituents A) to D) being present condensed with one another in the binder.

The stated binders are obtainable by polycondensation of the above-stated constituents A) to D).

SUMMARY

The binders of the invention have the advantage that binders are provided that overcome the disadvantages of the prior art. More particularly the binders of the invention are notable for low VOC levels of less than 250 g/L, more particularly of less than 100 g/L in the coating material. Moreover, when used in coatings, the binders of the invention lead to an increase in the long lastingness, to an enhanced corrosion prevention effect, and to increased chemical resistance on the part of the coatings obtained.

DETAILED DESCRIPTION

The binders of the invention consist substantially of four constituents.

Constituent A) are hydroxy-functional acrylate resins.

The hydroxy-functional acrylate resins A) comprise or have been prepared from at least one alkyl ester of methacrylic acid, more particularly of methyl methacrylic acid, from at least one hydroxyalkyl ester of methacrylic acid, from acrylic acid and from further vinylically unsaturated monomers.

The hydroxy-functional acrylate resins A) comprise or have been preferably prepared from:
- 35 to 50 wt % aromatic vinyl compounds,
- 10 to 25 wt % of one or more hydroxyalkyl esters of (meth) acrylic acid,
- 5 to 20 wt % of one or more alkyl esters of (meth) acrylic acid,
- 3 to 10 wt % of acrylic acid and/or methacrylic acid, and
- 12 to 30 wt % of a glycidyl ester of a saturated aliphatic monocarboxylic acid having 9-12 C atoms which is branched on the alpha carbon atom, preferably a glycidyl ester of Versatic acid, based in each case on the total weight of component A).

The aromatic vinyl compound may be styrene, alpha-methylstyrene or vinyltoluene.

Hydroxyalkyl esters of acrylic acid and/or methacrylic acid that can be used in accordance with the invention are hydroxyalkyl (meth)acrylate esters having 2 to 5 carbon atoms in the hydroxyalkyl radical, such as, for example, hydroxyethyl acrylate, hydroxyethyl methacrylate, hydroxypropyl methacrylate, hydroxypropyl acrylate, hydroxybutyl methacrylate, hydroxybutyl acrylate or mixtures thereof.

Alkyl esters of (meth) acrylic acid according to the invention are, in particular, alkyl esters having 1 to 12 carbon atoms in the alkyl radical. These include, for example, methyl methacrylate, ethylhexyl acrylate, ethyl methacrylate, isobornyl methacrylate, n-butyl acrylate, n-butyl methacrylate, isobutyl acrylate, isobutyl methacrylate, tert-butyl acrylate and tert-butyl methacrylate.

The molar masses Mn of component A) are in the range from 900 to 4000 g/mol, preferably 1000 to 3000 g/mol, more preferably 1000 to 2000 g/mol.

The hydroxyl numbers of the hydroxy-functional acrylate resins used are preferably between 85 to 160 mg KOH/g.

Suitable hydroxy-functional acrylate resins as component A) are, for example, the commercially available resins Synthalat™ A-TS 3737 (from Synthopol), Synocure™ 9293 (from Arkema) or Joncryl™ SCX 507 (from BASF).

Constituent B) of the binders of the invention are alkoxy- and/or silanol-functional polysiloxanes. The alkoxy- and/or silanol-functional polysiloxanes used preferably have a molecular weight Mn of between 300 and 5100 g/mol, preferably between 400 and 3000 g/mol, very preferably between 450 and 1800 g/mol.

Molecular weights in the context of the present invention are determined by GPC measurements. For the determination of the weight-average molecular weight Mw, the number-average molecular weight Mn and the polydispersity Mw/Mn, the measuring conditions observed were as follows: Column combination SDV 1000/10 000 Å (length 65 cm), temperature 30° C., THF as mobile phase, flow rate 1 ml/min, sample concentration 10 g/l, RI detector. The alkoxy- and/or silanol-functional polysiloxanes were evaluated against polystyrene standards (162-2 570 000 g/mol).

More particularly, component B) comprises non-linear, branched, alkoxy-functional and/or silanol-functional polysiloxanes, preferably those of the general formula 1,

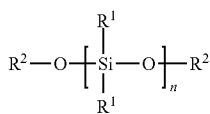 (formula 1)

in which $R_1$ independently at each occurrence are alkyl, aryl or alkoxy groups, hydroxyl or —$OSi(R_3)_3$ groups, where $R_3$ independently at each occurrence are alkyl, aryl or alkoxy groups, hydroxyl or $OSi(R_3)_3$ groups, and where $R_2$ independently at each occurrence may be hydrogen, alkyl groups or aryl groups, preferably alkyl groups, very preferably methyl groups or ethyl groups, and n is >1.

In formula 1, n is selected more particularly such that, depending on the nature of the selected groups $R_1$, $R_2$ and optionally $R_3$, the molecular weight Mn of the alkoxy-functional and/or silanol-functional polysiloxane is between 300 to 5100 g/mol, preferably 400 to 3000 g/mol, very preferably 450 to 1800 g/mol.

Alkyl groups are preferably linear or branched alkyl groups having 1 to 18 C atoms, and more particularly they are methyl groups.

Aryl groups are preferably aryl groups having 6 to 18 C atoms, and more particularly are phenyl groups.

Alkoxy groups are preferably linear or branched alkoxy groups having 1 to 18 C atoms, and more particularly are methoxy groups or ethoxy groups.

In formula 1, n is >1, meaning that the alkoxy-functional and/or silanol-functional polysiloxane has at least two —Si $(R_1)_2$—O— units as per formula 1. In this case, the radicals $R_1$, both within and between the individual $Si(R_1)_2$—O— units, are selectable independently of one another from the groups stated above, and can therefore be combined with one another in any desired way.

The alkoxy-functional and/or silanol-functional polysiloxanes of formula 1 that are employed with preference are therefore (phenyl)methylpolysiloxanes, with methoxy-functional or ethoxy-functional (phenyl)methylpolysiloxanes being especially preferred.

The alkoxy-functional and/or silanol-functional polysiloxanes of formula 1 contain preferably approximately 4 to 70 silicon atoms.

The alkoxy-functional and/or silanol-functional polysiloxanes of formula 1 may therefore contain the following structural elements:

M, $M^{OR}$, D, $D^{OR}$, T, $T^{OR}$ and Q, where:
M=$[(R_4)_3SiO_{1/2}]$
D=$[(R_4)_2SiO_{2/2}]$
T=$[(R_4)SiO_{3/2}]$
Q=$[SiO_{4/2}]$,
$M^{OR}$=$[(R_5)_{3-m}(R_4)_mSiO_{1/2}]$
$D^{OR}$=$[(R_5)_{2-p}(R_4)_pSiO_{2/2}]$
$T^{OR}$=$[(R_5)SiO_{3/2}]$ or $[(R_4)SiO_{3/2}]$, where $R_5$=aliphatic or aromatic alkoxy radical having up to 18 C atoms or hydroxyl, preferably methoxy or ethoxy,
$R_4$=aliphatic or aromatic alkyl or aryl radical having up to 18 C atoms, preferably phenyl or methyl,
m=0, 1, 2 or 3
and p=0, 1 or 2.

The alkoxy or silanol content of the alkoxy- and/or silanol-functional polysiloxanes is between 5 and 30 wt %, preferably between 8 and 25 wt %, especially between preferably 10 and 20 wt %.

Employed as component C) are dicarboxylic or polycarboxylic acids, more particularly aromatic, aliphatic or cycloaliphatic dicarboxylic or polycarboxylic acids and their derivatives, such as phthalic anhydride, isophthalic acid, terephthalic acid, adipic acid, maleic anhydride, fumaric acid, succinic anhydride, hexahydrophthalic anhydride, methylhexahydrophthalic anhydride dimethyl terephthalate, naphthalenedicarboxylic acid, cyclohexanedicarboxylic acid, hexahydrophthalic acid, succinic acid, glutaric acid, adipic acid, sebacic acid, azelaic acid, 1,12-dodecanedicarboxylic acid and 1,14-tetradecanedicarboxylic acid, and also the diesters and anhydrides thereof.

Preference is given to using phthalic anhydride, isophthalic acid, terephthalic acid and/or dimethyl terephthalate, adipic acid, maleic anhydride, fumaric acid, succinic anhydride, hexahydrophthalic anhydride, methylhexahydrophthalic anhydride as component C).

Serving as component D) are diols or polyols, more particularly aliphatic polyols such as, for example, ethylene glycol, propanediols [1,2 and 1,3], butane-1,4-diol, hexane-1,6-diol, neopentyl glycol and other neodiols (neopentyl glycol hydroxypivalate; trimethylpentanediol; polyether polyols). Examples of polyhydric alcohols which can be used are trimethylolpropane, pentaerythritolol, ditrimethylolpropane, etc. As an example of cycloaliphatic polyols, use may be made of perhydrobisphenol A, dimethylolcyclohexane and 3(4),8(9)-dihydroxymethyltricyclo[5.2.1.02,6] decane (TCD Alcohol DM).

Furthermore, as components C) and D), it is also possible for monocarboxylic acids and monoalcohols to have been added in order to control the polycondensation. Examples of suitable monocarboxylic acids are benzoic acid, isononanoic acid, 2 ethylhexanoic acid, Versatic acid or saturated or unsaturated fatty acids; examples of suitable monoalcohols are 1-octanol, dodecanol, hexadecanol, 2-ethylhexanol, 2-octyldodecan-1-ol.

The binder of the invention is prepared from the components stated above. The binder of the invention is a silicone-acrylate-polyester hybrid binder. The term "silicone hybrid binder" is defined as a composition composed of an alkoxy- or silanol-functional branched polysiloxane which is connected via Si—O—C or Si—C linkages to organic groups or resins. The chemical attachment of the organic building blocks, such as mono- or polyhydric alcohols/polyols, for example, and also the attachment of the OH-functional polyacrylates, is via the alkoxy- or silanol groups of the polysiloxane, with formation of a Si—O—C bond.

The binder of the invention is composed in total of an acrylate component A), a siloxane component B), and a polyester component comprising C) and D). With more particular preference the binder of the invention is composed of 10 to 50 wt % of component B) and 50-90 wt % of a combination of component A) and of the polyester component comprising C) and D), based on the solids content of the binders.

The weight ratio of component A) to the polyester constituent comprising components C) and D) is in particular 1:9 to 9:1, preferably 3:7 to 7:3. The fraction of a monoalcohol or of a monocarboxylic acid is, in particular, 2 to 20 wt %, based on the total amount of all the components. The stated weight fractions amount in total to 100 wt %.

A further subject of the present invention is a process for preparing binders in accordance with the present invention, in which a hydroxy-functional acrylate resin A), an alkoxy- and/or silanol-functional polysiloxane B), one or more dicarboxylic or polycarboxylic acids C) and one or more diols or polyols D) are reacted with one another via a polycondensation.

The process of the invention takes place preferably in what is called a "one-pot synthesis" at temperatures of 80-260° C., preferably at 180-230° C.; in other words, the aforementioned components A) to D) are reacted with one another at the stated temperatures.

In the polycondensation reaction of components A) to D) it is possible additionally to use an esterification catalyst, such as Lewis acids, acids or bases, for example. Typical catalysts are organotitanium or organotin compounds such as tetrabutyl titanate or dibutyltin oxide. Also conceivable are catalysts based on other metals, such as zinc or antimony, for example, and also metal-free esterification catalysts. The amount of catalyst added is generally 0.01 to 1.0 wt %, preferably 0.05 to 0.3 wt %, based on the total amount of components A) to D).

During the polycondensation reaction, the water formed and also the alcohol are removed completely by distillation. This can be done, for example, by means of azeotropic distillation. The polycondensation reaction of the invention is continued until the target values for hydroxyl number and acid number have been reached. The solvent-free polycondensation product obtained constitutes a high-viscosity, tacky or solid material which according to its composition has different viscosities, hydroxyl numbers and acid numbers.

The desired OH number for the binder of the invention is in the range from 80 to 300 mg KOH/g, preferably in the range from 150 to 230 mg KOH/g. The OH number is determined by titrimetry. The sample is acetylated with acetic anhydride in the presence of pyridine. For each hydroxyl group, one mol of acetic acid is produced, while the excess acetic anhydride yields two mols of acetic acid.

The consumption of acetic acid is determined by titrimetry from the difference between the main value and a blank value, which is carried out in parallel. Taking account of the number of ml of 0.5 N aqueous potassium hydroxide solution consumed in the main and blank runs, and also of the acid number of the sample and of the initial mass, the hydroxyl number is computed.

$$OHN = \frac{(b-a) \times 28.05}{E} AN + SZ$$

a=ml of 0.5 N aqueous potassium hydroxide solution consumed in the main run
b=ml of 0.5 N aqueous potassium hydroxide solution consumed in the blank run
E=initial mass in g The desired acid number for the binder of the invention is in the range from 0.1 to 20 mg KOH/g, preferably in the range from 1 to 10 mg KOH/g, very preferably 1.5 to 7 mg KOH/g. The acid number is determined likewise by titrimetry. The acid number indicates the number of mg of KOH required to neutralize the free fatty acids present in 1 g of fatty acid. An appropriate initial mass is weighed out into a glass beaker, dissolved in about 100 ml of neutralized ethanol, and titrated potentiometrically to the end point with aqueous sodium hydroxide solution. The evaluation of the acid number is determined as follows:

$$AN[mgKOH/g] = \frac{V \times 56.1 \times n \times f}{E}$$

V=titrant consumed (ml)
n=normality of titrant
MW=molar mass of the acid
E=initial mass of the sample (g)
f=titrant factor The polycondensation is carried out with or without solvent, preferably in the absence of solvents.

Depending on viscosity, suitable solvents, such as n-butyl acetate, aromatic or non-aromatic solvents or other solvents, for example, may be used to adjust the solids content. Preferred solvents are more particularly: glycol ethers, such as ethylene glycol dimethyl ether, glycol ether esters, esters such as butyl glycol acetate, 3-methoxy-n-butyl acetate, butyl acetate, ethoxypropyl acetate, ketones such as methyl ethyl ketone, methyl isobutyl ketone, aromatic hydrocarbons such as xylene, Solvesso 100 and Shellsol A. Particularly suitable is butyl acetate. Preferred is a solids content of >80 wt % more preferably >85 wt %, very preferably >90 wt %.

The molecular weights $M_n$ of the binders of the invention are between 700 to 3000 g/mol, preferably 800 to 2000 g/mol.

In a further preferred embodiment, the binders of the invention can be reacted with di- or polyisocyanates, isocyanatosilanes and/or aminosilanes. Hence there is a modification of the binders of the invention. Also possible in the context of the present invention here is a multiple reaction; in other words, for example, the binders of the invention may be reacted first with di- or polyisocyanates and subsequently with aminosilanes. The modification is preferably performed such that the binders of the invention have alkoxysilyl groups in the end product.

Suitable di- and/or polyisocyanates are preferably substituted or unsubstituted aromatic, aliphatic, cycloaliphatic and/or heterocyclic polyisocyanates that are known per se. Examples of preferred di- and/or polyisocyanates are toluene 2,4-diisocyanate, toluene 2,6-diisocyanate, diphenylmethane-4,4'-diphenylene diisocyanate, diphenylmethane 2,4'-diisocyanate, hexamethylene diisocyanate, isophorone diisocyanate (Vestanat® IPDI), dicyclohexylmethyl diisocyanate (Vestanat® $H_{12}$MDI). Additionally preferred polyisocyanates are the biuret dimers and the isocyanurate trimers of the aforementioned diisocyanates.

Particularly preferred polyisocyanates are hexamethylene 1,6-diisocyanate, isophorone diisocyanate and dicyclohexylmethyl diisocyanate, their biuret dimers and/or isocyanurate trimers.

Preferred aminosilanes are bis(3-propyltrimethoxysilyl)amine, bis(3-propyltriethoxysilyl)amine, aminopropyltrimethoxysilane, aminopropyltriethoxysilane, N-(n-butyl)-3-aminopropyltrimethoxysilane, 3-aminopropylmethyldiethoxysilane. Corresponding aminosilanes are available for example under the names DYNASYLAN® from Evonik Industries AG and Silquest™ from Momentive.

Preferred isocyanatosilanes are 3-isocyanatopropyltrimethoxysilane (Vestanat® EP-IPMS from Evonik Industries AG) or 3-isocyanatopropyltriethoxysilane. In the case of preferred use of such isocyanatosilanes, the modification to form a silyltrialkoxy-functional silicone acrylate polyester may take place directly.

The modification of an OH-functional silicone acrylate hybrid resin of the invention may preferably take place first with a di- or polyisocyanate and subsequently with an aminosilane. The binder obtained, with a silyltrialkoxy function, may be described in simplified form by the general formula 2:

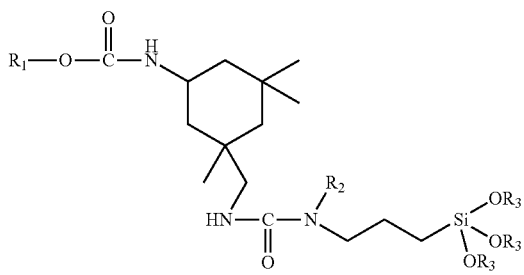

(formula 2)

in which $R_1$ describes the linkage to the hydroxy-functional silicone hybrid resin of the invention, $R_2$ independently at each occurrence may be alkyl, aryl or alkyl-silyltrialkoxy, and $R_3$ are alkyl groups, preferably methyl- or ethyl-.

If isocyanatosilanes are used, such as Vestanat® EP-IPMS from Evonik Industries AG, for example, the modification of the binders of the invention takes place in accordance with the formula 3,

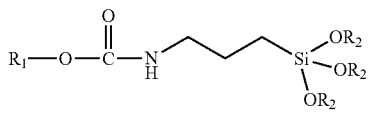

(formula 3)

in which $R_1$ describes the linkage to the hydroxy-functional silicone hybrid resin of the invention and $R_2$ are alkyl groups, preferably methyl- or ethyl-.

A further subject of the present invention is the use of the binders of the invention in coatings. Coatings comprising the binders of the invention are likewise a subject of the present invention. The OH-functional binders of the invention are used in particular for producing 1- or 2-component coatings, more particularly for topcoat materials and anticorrosion coating materials, here more particularly in boat building, or for general industrial coatings such as, for example, for agricultural machinery and construction machinery.

Other suitable areas of use are as protective coatings for offshore drilling platforms or bridges. Binders of the invention are suitable especially for ultra-high-solids topcoat materials featuring high weather stability and also high chemical resistance with respect to acids, bases, kerosene, petrol, diesel or Skydrol.

In the case of 2-component coatings, polyisocyanates, for example, are used. The polyisocyanates which can be used for crosslinking the binders of the invention are typical coatings of polyisocyanates such as, for example, the Desmodur®N products from Bayer AG or the Vestanat® HT products from Evonik Industries AG. Use may be made of aliphatic or cycloaliphatic and aromatic polyisocyanates, as for example hexamethylene diisocyanates, trimethylhexamethylene diisocyanate, isophorone diisocyanate, 4,4'-diisocyanatodicyclohexylmethane, tolylene 2,4 diisocyanate, ortho-, -meta- and para-xylylene diisocyanate, 4,4'-diisocyanatodiphenylmethane, and also masked polyisocyanates, such as polyisocyanates masked with CH-, NH- or OH-acidic compounds, for example. Also suitable, moreover, are polyisocyanates containing biuret, allophanate, urethane or isocyanurate groups.

The fraction of polyisocyanate crosslinker is selected such that there are 0.5 to 1.5 isocyanate groups per hydroxyl group of the silicone hybrid binder. Excess isocyanate groups are able to be consumed by reaction with moisture, and to contribute to the crosslinking.

In the presence of atmospheric moisture, the curing of such silylalkoxy-functional binders takes place with suitable catalysts, generally at room temperature, with hydrolysis and condensation of the silyltrialkoxy groups.

Catalysts which promote the curing of alkoxysilyl groups are well known to the skilled person. The following examples may be given: Tin compounds such as tin diacetate, tin dioctoate, dibutyltin diacetylacetonate, dibutyltin dilaurate, tin tetraacetate, dibutyltin diacetate, dibutyltin dioctoate, dibutyltin dilaurate, dibutyltin dioleate, dimethoxydibutyltin, dimethyltin, dibutyltinbenzyl maleate, bis(triethoxysiloxy)dibutyltin, diphenyltin diacetate, titanium compounds, such as tetraethoxytitanium, tetra-n-propoxytitanium, tetraisopropoxytitanium, tetra-n-butoxytitanium, tetraisobutoxytitanium, tetrakis(2-ethylhexoxy)titanium, diisopropoxybis(ethylacetoacetato)titanium, dipropoxybis(acetylacetonato)titanium, diisopropoxybis(acetylacetonato)titanium, dibutoxybis(acetylacetonato)titanium, triisopropoxyallyltitanium acetate, isopropoxyoctylene glycoltitanium oxide or bis(acetylacetonato)titanium oxide, metalloaliphatic compounds, such as lead diacetate, lead di-2-ethylhexanoate, lead dineodecanoate, lead tetraacetate, lead tetrapropionate, zinc acetylacetonate, zinc 2-ethylcaproate, zinc diacetate, bis(2-ethylhexanoyl)zinc, zinc dineodecanoate, zinc diundecenoate, zinc dimethacrylate, tetrakis(2-ethylhexanoyl)zirconium dichloride, tetrakis(methacryloyl)zirconium dichloride and cobalt diacetate. Furthermore use may also be made of bismuth catalysts, examples being the catalyst known as the Borchi catalyst, iron(II) and iron(III) compounds, examples being iron(III) acetylacetonate or iron diacetate, aluminum compounds, an example being aluminum acetylacetonate, calcium compounds, an example being calcium ethylenediaminetetraacetate or magnesium compounds, an example being magnesium ethylenediaminetetraacetate, as catalysts.

Also suitable, furthermore, are amine structures, e.g. triethylamine, tributylamine, aminopropyltrimethoxysilane, N-(2-aminoethyl)-3-aminopropyltrimethoxysilane, tetramethylguanidine or 1,8-diazabicyclo [5.4.0.]-7-undecene, 1,4-diazabicyclo [2.2.2]octane, 1,8-diazabicyclo[5.4.0]undec-7-ene, 1,5-diazabicyclo-[4.3.0]non-5-ene, N,N-bis(N,N-dimethyl-2-aminoethyl)-methylamine, N,N-dimethylcyclohexylamine, N,N-dimethylphenylamine or N ethylmorpholine. Likewise catalytically active are tetraalkylammonium compounds, such as N,N,N-trimethyl-N-2-hydroxypropylammonium hydroxide, N,N,N-trimethyl-N-2-hydroxypropylammonium 2-ethylhexanoate or choline 2-ethylhexanoate. Organic or inorganic Brønsted acids as well, such as methanesulphonic acid, p-toluenesulphonic acid, dodecylbenzenesulphonic acid, 1-naphthalenesulphonic acid, camphorsulphonic acid, acetic acid, trifluoroacetic acid or benzoyl chloride, hydrochloric acid, phosphoric acid, the monoesters and/or diesters thereof, such as, for example, butyl phosphate, (iso)propyl phosphate, dibutyl phosphate etc., are suitable as catalysts. Inorganic and organic Brønsted bases as well, such as sodium hydroxide, tetramethylammonium hydroxide, potassium hydroxide, or tetrabutylammonium hydroxide, for example, are suitable as catalysts. It is of course also possible to employ combinations of two or more catalysts.

So-called photolatent bases as well are known as crosslinking catalysts, as described in WO 2005/100482. Photolatent bases are preferably organic bases having one or more basic nitrogen atoms, which initially are present in a blocked form and which release the basic form only on irradiation with UV light, visible light or IR radiation, through splitting of the molecule.

Also catalytically active are catalysts which are sold by Du Pont under the trade name Tyzor®. The same is true of catalysts of the type Kenreact® (Kenrich), Borchi Kat® (Borchers) and K-Cure®/Nacure® (King Industries).

Even without further observations, it is assumed that a skilled person is able to utilize the above description to its widest extent. The preferred embodiments and examples are therefore to be interpreted merely as a descriptive disclosure which is by no means limiting in any way whatsoever.

The present invention is elucidated in more detail below using examples. Alternative embodiments of the present invention are obtainable in an analogous way.

EXAMPLES

In the context of the present invention, the following methods have been used in addition to those measurement methods already stated above:

a) Viscosity, Determined using Brookfield LV-DV-I+ Spindle Viscosimeter

The viscosities were determined by means of a Brookfield LV-DV-I+ spindle viscosimeter. Brookfield viscosimeters are rotary viscosimeters having defined spindle sets as rotary bodies. The rotary bodies used were from an LV spindle set. Owing to the temperature dependence of viscosity, the temperatures of the viscosimeter and of the measuring liquid were kept constant during the measurement, with an accuracy of +/−0.5° C. Materials used in addition to the LV spindle set were a thermostatable waterbath, a 0-100° C. thermometer (scale divisions 1° C. or smaller) and a timer (scale values not greater than 0.1 second). To perform the measurement, 100 ml of the sample were introduced into a wide-necked bottle and measured under temperature-controlled conditions in the absence of air bubbles after prior calibration. To determine the viscosity, the viscosimeter was positioned relative to the sample such that the spindle dips into the product up to the mark. The measurement is initiated by activation of the start button, while care was taken to ensure that the measurement took place in the most favorable measurement region of 50% (+/−20%) of the maximum measurable torque. The result of the measurement was displayed by the viscosimeter in mPas, while division by the density (g/ml) gives the viscosity in $mm^2/s$.

b) Determination of the Non-Volatiles Content (Determination of Solids)

Determining the amount of non-volatile fractions is done in accordance with DIN EN ISO 3251:2008; in the context of the present invention, the testing is carried out at 125° C. for 60 minutes for determining the solids.

c) Drying Time Measurements

A suitable means of assessing the catalytic activity of catalysts in a binder is to determine the drying time using a Drying Recorder. A test method of this kind is described by ASTM D5895. In analogy to this test method, drying time measurements were conducted using a BK3 Drying Recorder (The Mickle Laboratory Engineering Co. Ltd., Goose Green, Gomshall, Guildford, Surrey GUS 9LJ, UK). In this case, thin films of binder were applied to standard glass strips (30×2.5 cm×2 mm) using a four-way bar applicator (Erichsen Model 360). Beforehand, the standard glass strips were freed from adhering dust, dirt and grease with acetone and subsequently with an ethanol/DI water mixture. Using a lever on the reverse, the slide was then shifted leftwards into the start position. The scoring scribes were then folded down onto the sample glass plates. The test duration was set to 6, 12 or 24 hours, and measurement was commenced. After the end of the test duration, the scoring scribes were folded up and the glass plates were removed for assessment. The instants of initial drying and volume drying were read off using the associated timescale.

d) König Pendulum Hardness

For the König determination of pendulum hardness (DIN 53157 or EN ISO 1522), the measure used is the damping of a swinging pendulum. The pendulum with two stainless steel balls is placed onto a coating film. There is a physical relationship between the duration of pendulum swinging, amplitude, and the geometric dimensions of the pendulum. The viscoelastic behavior of the coating is the decisive factor for the hardness. When the pendulum is set in swinging motion, the balls roll on the surface and thereby exert pressure on it. The greater or lesser recovery is dependent on the elasticity. The absence of elastic forces causes severe damping of the pendulum movement. High elastic forces, in contrast, cause only little damping. "König" pendulum hardness: Number of swings in osc.

1 oscillation=1.4 seconds e) Gloss Measurement and Gloss Retention

The principle of gloss measurement is based on the measurement of the directed reflection in accordance with DIN EN ISO 2813. For this purpose, the intensity of the reflected light is measured in a narrow range of the reflection angle. The intensity of the reflected light is dependent on the material and on the incident beam angle. In the case of coating materials, more light is reflected as incident radiation increases. The remainder of the irradiated light penetrates the material, where, according to shade, it is partly absorbed or diffusely scattered. The measurement results of the gloss meter are based not on the quantity of light irradiated, but instead on a black, polished glass standard with a defined refractive index. For this standard, the measurement value is set at 100 gloss units (calibration).

The gloss retention in % for a coating surface is computed using the following formula:

$$\text{Gloss retention in }\% = \frac{B*100}{A}$$

B=gloss after UV exposure
A=gloss before UV exposure f) Color Difference ΔE

Delta E, often written as dE or ΔE, is a measure of the perceived color difference, which as far as possible is "equidistant" for all colors occurring. The Delta here stands as a symbol for the difference. It is possible accordingly to quantify studies which deal with colors.

The color difference is normally reported as Delta E. DIN 5033 Part 2 prefers the German term Farbabstand over the German term Farbdifferenz for color difference. As opposed to the term Farbunterschied, color difference is used for the quantified form. Any color occurring in reality, including any color emitted or measured by an instrument, can be assigned a color locus within a three-dimensional space. The reason why this is possible lies in the Graßmann law.

The value of Delta E between the color loci $(L^*, a^*, b^*)_p$ and $(L^*, a^*, b^*)_v$ is calculated as a Euclidian distance in accordance with ISO 12647 and ISO 13655:

$$\Delta E_{p,v} = \sqrt{(L^*_p - L^*_v)^2 + (a^*_p - a^*_v)^2 + (b^*_p - b^*_v)^2}$$

Evaluation of ΔE

For color differences ΔE as the Euclidian distance between the L*a*b* values (or from the polar coordinates L*C*h*), the assessment identified in the table below is customarily stated.

| ΔE | Evaluation |
|---|---|
| 0.0 . . . 0.5 | no or virtually no difference |
| 0.5 . . . 1.0 | difference may be noticeable to the trained eye |
| 1.0 . . . 2.0 | notable color difference |
| 2.0 . . . 4.0 | perceived color difference |
| 4.0 . . . 5.0 | substantial color difference, not often tolerated |
| above 5.0 | the difference is evaluated as a different color. |

In the CMC system, the value ΔE=1, is recorded as "still tolerable color deviation". Since, in spite of the improvements achieved, color spaces are in agreement with perception only in the close vicinity of the color locus, a ΔE=10 and higher should be seen preferentially as a different color.

g) QuV-A Testing

The assessment of the weather resistance of coatings is simulated by means of a QUV accelerated weathering instrument. With a UVA-340 lamp, the QUV affords the most realistic simulation of sunlight in the shortwave component of the spectrum [sunlight in the critical shortwave range between 365 nm and the lower limit for sunlight (295 nm)]. The QUV yields excellent, relative predictions about damage suffered by materials outdoors. The test is carried out as a cycling test in accordance with the ASTM G 154 standard. One cycle constitutes:

a) UV irradiation for 8 hours with a radiation intensity of 0.89 W/m$^2$ at a temperature of 60° C.
b) a condensation interval of 4 hours without UV irradiation, at 50° C.
   The coating surfaces produced with the binders prepared from the examples were then exposed for a total of 1000 hours.

Example 1 (Inventive)

In a reaction vessel, 446 g of DC 3074 (methoxy-functional methyl/phenylsilicone resin from Dow Corning), 149 g of neopentyl glycol, 64 g of trimethylolpropane, 119 g of methylhexahydrophthalic anhydride, 52.5 g of cyclohexyldimethanol, 82 g of isononanoic acid and 663 g of Syntalat™ A-TS 3737 (hydroxy-functional acrylate resin from Synthopol Chemie) are introduced and are heated to 180° C. with supply of nitrogen, with a top-mounted column attachment for the separation of the alcohol and water formed during the reaction. The temperature is raised continuously to 230° C.

After about 8 to 13 hours, the polycondensation is ended after acid numbers <5 mg KOH/g are reached. In this case the conversion is about 96%.

The silicone acrylate polyester hybrid resin obtained is adjusted using n-butyl acetate to a solids content of 90 wt %. The characteristic numbers obtained were as follows:
Solids content: 90 wt % (1 h at 125° C.)
Viscosity: 9000 mPa*s
Acid number: 2.3 mg KOH/g
Hydroxyl number: 184 mg KOH/g Example 2 (Inventive)

In a reaction vessel, 98 g of Silres™ SY 231 (methoxy-functional methyl/phenylsilicone resin from Wacker), 121 g of Joncryl™ SCX 507 (hydroxy-functional acrylate resin from BASF), 66 g of TegoSoft G20 (2-octyldodecan-1-ol), 27 g of trimethylolpropane, 18 g of neopentyl glycol and 42.5 g of methylhexahydrophthalic anhydride are introduced and are heated to 180° C. with supply of nitrogen, with a top-mounted column attachment for the separation of the alcohol and water formed during the reaction. The temperature is raised continuously to 230° C.

After about 8 to 13 hours, the polycondensation is ended after acid numbers <5 mg KOH/g are reached. In this case the conversion is about 96%.

The silicone acrylate polyester hybrid resin obtained is adjusted using n-butyl acetate to a solids content of 80 wt %. The characteristic numbers obtained were as follows:
Solids content: 80 wt % (1 h at 125° C.)
Viscosity: 350 mPa*s
Acid number: 2.3 mg KOH/g
Hydroxyl number: 110 mg KOH/g Example 3 (Inventive)

In a reaction vessel, 755 g of DC 3074 (methoxy-functional methyl/phenylsilicone resin from Dow Corning), 300.5 g of neopentyl glycol, 119.4 g of monoethylene glycol, 300.5 g of methylhexahydrophthalic anhydride, and 1877 g of Joncryl™ 507 (hydroxy-functional acrylate resin from BASF SE) are introduced and are heated to 180° C. with supply of nitrogen, with a top-mounted column attachment for the separation of the alcohol and water formed during the reaction. The temperature is raised continuously to 210° C.

After about 8 to 13 hours, the polycondensation is ended after acid numbers <5 mg KOH/g are reached. In this case the conversion is about 96%.

The silicone acrylate polyester hybrid resin obtained is adjusted using n-butyl acetate to a solids content of 80 wt %. The characteristic numbers obtained were as follows:
Solids content: 80 wt % (1 h at 125° C.)
Viscosity: 1100 mPa*s
Acid number: 3.5 mg KOH/g
Hydroxyl number: 152 mg KOH/g Example 4 (Inventive)

A reaction vessel with reflux condenser and dropping funnel is charged with 150 g of the hydroxy-functional silicone hybrid resin prepared from Example 2. At room temperature, with supply of nitrogen, 43 g of Vestanat® IPDI (isophorone diisocyanate from Evonik Industries AG) are added dropwise, and the batch is heated to 50° C. and held at the temperature for about 2 hours until the theoretical NCO value of 4.6% (based on resin solids) has been reached. The batch is cooled to room temperature and, in a separate dropping funnel, 59 g of N-(3-trimethoxysilylpropan-1yl-)-N-n-butylamine (Dynasylan® 1189 from Evonik Industries AG) are added dropwise at a rate such that the temperature does not exceed 40° C.

When the addition is ended, the resulting binder is adjusted using a solvent mixture of 2 parts n-butyl acetate and 1 part isobutanol to a solids of 70 wt %.
Viscosity: 500 mPa*s Example 5 (Inventive)

In a reaction vessel, 207.5 g of DC 3074 (methoxy-functional methyl/phenylsilicone resin from Dow Corning), 692 g of Synocure™ 9293 (hydroxy-functional acrylate resin from Arkema) and 99 g of 1-octanol are introduced and are heated to 100° C. with supply of nitrogen, with a top-mounted column attachment for the separation of the alcohol formed during the reaction.

After about 6 to 8 hours, the polycondensation is ended after the theoretical amount of distillate has been reached.

The silicone acrylate hybrid resin obtained is adjusted using n-butyl acetate to a solids content of 78 wt %. The characteristic numbers obtained were as follows:
  Solids content: 78 wt % (1 h at 125° C.)
  Viscosity: 2430 mPa*s
  Acid number: 4.2 mg KOH/g
  Hydroxyl number: 60 mg KOH/g A further reaction vessel is charged with 222 g of Vestanat® HT 2500 LV (HDI isocyanurate from Evonik Industries AG). With stirring, 278 g of bis(trimethoxysilylpropyl)amine (Dynasylan® 1124 from Evonik Industries AG) are metered in at a rate such that the temperature does not exceed 40° C. The characteristic numbers obtained were as follows:
  Solids content: 99 wt % (1 h at 125° C.)
  Viscosity: 66 000 mPa*s
  NCO number: 3.4 wt %

A reaction vessel is charged with 200 g of the 78%-form, hydroxy-functional silicone acrylate hybrid resin, which is diluted with 74 g of n-butyl acetate. With stirring, 196 g of the silylalkoxy-functional isocyanate prepolymer are added and the components of the batch are allowed to react at 40° C. for about 4 to 5 hours until the NCO value is zero. The characteristic numbers obtained were as follows:
  Solids content: 75 wt % (1 h at 125° C.)
  Viscosity: 4100 mPa*s Example 6 (Inventive)

A reaction vessel with reflux condenser and dropping funnel is charged with 100 g of the hydroxy-functional silicone hybrid resin prepared from Example 3. At room temperature, with supply of nitrogen, 55.4 g of Vestanat® $H_{12}$MDI (dicyclohexylmethyl diisocyanate from Evonik Industries AG) are added dropwise, and the batch is heated to 50° C. and held at the temperature for about 2 hours until the theoretical NCO value of 5.7% (based on resin solids) has been reached. The batch is cooled to room temperature and in a separate dropping funnel a mixture of 48 g of bis(triethoxysilylpropyl)amine (Dynasylan® 1122 from Evonik Industries AG), 24.7 g of diisononylamine and 0.8 g of isobutanol is added dropwise at a rate such that the temperature does not exceed 40° C.

When the addition is ended, the resulting binder is adjusted with n-butyl acetate to a solids of 70 wt %.
  Viscosity: 4090 mPa*s Example 7 (Inventive)

A reaction vessel with reflux condenser and dropping funnel is charged with 100 g of the hydroxy-functional silicone hybrid resin prepared from Example 3 and with 80 g of Dynasylan® MTES (methyltriethoxysilane from Evonik Industries AG). At room temperature, with supply of nitrogen, 55.5 g of Vestanat® $H_{12}$MDI (dicyclohexylmethyl diisocyanate from Evonik Industries AG) are added dropwise, and the batch is heated to 50° C. and held at the temperature for about 2 hours until the theoretical NCO value of 4.1% (based on resin solids) has been reached. The batch is cooled to room temperature and in a separate dropping funnel a mixture of 49.4 g of bis(triethoxysilylpropyl)amine (Dynasylan® 1122 from Evonik Industries AG), 26.4 g of diisononylamine and 0.9 g of isobutanol is added dropwise at a rate such that the temperature does not exceed 40° C.

When the addition is ended, the resulting binder is adjusted with n-butyl acetate to a solids of 90 wt %.
  Viscosity: 2500 mPa*s Preparation of a 2-Component Polyurethane Topcoat From the corresponding binders from Examples 1 and 3, a white-pigmented topcoat material (Table 1) and also a clearcoat material (Table 2) are produced. Serving as comparative material is Synthalat™ A-HD 6387, a siloxane-containing high-solids acrylate resin from Synthopol that has a viscosity of 12 000 to 18 000 mPa*s at a solids of 75%.

TABLE 1

|  | Comparative | White paint 1 |
|---|---|---|
| Comparative binder (75%) | 56.0 |  |
| Example 1 binder (90%) |  | 50.0 |
| Tego ® Airex 900[1] | 0.3 | 0.3 |
| Tego ® Dispers 670[2] | 1.0 | 1.0 |
| Butyl acetate |  | 3.6 |
| Butyl glycol acetate | 1.5 | 1.5 |
| Isobutanol |  |  |
| Thixatrol ST[3] | 0.3 | 0.3 |
| Kronos 2315[4] | 33.0 | 35.0 |
| Blanc fixe micro[5] | 7.7 | 8.0 |
| Tib Kat 218[6] (10% in BuAc) | 0.2 | 0.3 |
| Total weight | 100 | 100 |
| Coating material solids | 83% | 89% |

[1]Tego Airex 900 is a deaerating agent from Evonik Industries AG
[2]Tego Dispers 670 is a dispersing additive from Evonik Industries AG
[3]Thixatrol ST is a rheological additive from Elementis
[4]Kronos 2315 is a titanium dioxide from Kronos
[5]Blanc fixe micro is a micronized barium sulphate from Sachtleben
[6]Tib Kat 218 is a catalyst from Tib Chemicals

TABLE 2

|  | Comparative | Clearcoat 1 |
|---|---|---|
| Comparative binder (75%) | 95.0 |  |
| Example 1 binder (90%) |  |  |
| Example 3 binder (70%) |  | 95.0 |
| Butyl acetate | 5.0 | 5.0 |
| Total weight | 100 | 100 |

Isocyanate curing agent Vestanat® HT 2500 LV mixture:

| Vestanat ® HT 2500 LV | 80.0 |
|---|---|
| Butyl acetate | 20.0 |
| Total weight | 100 |

The white paint from Table 1 was cured using the isocyanate curing agent mixture as follows, with the fraction of the curing agent being calculated stoichiometrically, in other words from the ratio of NCO groups to OH groups from resin:
  Comparative: 100:24
  White paint 1: 100:34

The clearcoat from Table 2 was cured with the isocyanate curing agent mixture as follows:
  Comparative: 100:43
  Clearcoat 1: 100:69

To test the technical coatings properties, the clearcoat 1 and also the comparative were cured by means of the isocyanate curing agent mixture in the proportions stated. The clearcoat materials were drawn down with virtually the same dry film thickness of approximately 50 μm, and were dried for 7 days at room temperature (about 20 to 25° C.). Evaluated subsequently were König pendulum hardnesses, drying recorder drying times, MEK double rubs, and UV stability after 1000 hours of UV-A exposure. The results of testing are summarized in Table 3.

TABLE 3

Clearcoat results

|  | Comparative | Clearcoat 1 |
| --- | --- | --- |
| Film thickness μm | 45 | 50 |
| Initial drying in hours | 1.5 | 1.5 |
| Through-drying in hours | 6 | 5 |
| König pendulum hardness in sec |  |  |
| after 1 day | 21 | 30 |
| after 7 days | 74 | 97 |
| MEK double rubs after 7 days | 77 | 190 |
| 1000 hours of QUV-A exposure |  |  |
| Gloss retention in %, 20° angle | 97 | 100 |
| ΔE | 4.3 | 2.7 |

The chemical resistance of the white paints from Table 1 was tested. The coating materials of the comparative binder and the white paint 1 were cured with the isocyanate curing agent mixture in the proportions stated. The white paints were drawn down with virtually the same dry film thickness of approximately 50 μm, and were dried for 7 days at room temperature (about 20 to 25° C.). The coatings were subsequently exposed for 8 hours to a cotton pad impregnated with the chemicals listed in Table 4, at room temperature (20 to 25° C.).

TABLE 4

Chemical resistance of white paints

|  | Comparative | Example 1 |
| --- | --- | --- |
| Acetic acid (10%) | 1 | 1 |
| Hydrochloric acid (10%) | 1 | 1 |
| Sulphuric acid (50%) | 1 | 3 |
| Sodium hydroxide solution (20%) | 1 | 1 |
| Hydraulic oil | 1 | 1 |
| Isopropanol | 2 | 2 |

Ranking/evaluation:
1 = no change to film surface
2 = slight attack of film surface
3 = severe attack of film surface Preparation of a Moisture-Curing Topcoat Material From the corresponding binders from Examples 4 to 7, a white-pigmented topcoat material (Table 5) and a clearcoat material (Table 6) were produced as below.

TABLE 5

|  | White paint 1 | White paint 2 | White paint 3 | White paint 4 |
| --- | --- | --- | --- | --- |
| Example 4 binder (70%) | 60 |  |  |  |
| Example 5 binder (75%) |  | 56 |  |  |
| Example 6 binder (70%) |  |  | 60 |  |
| Example 7 binder (90%) |  |  |  | 47 |
| Tego ® Airex 900[1] | 0.3 |  |  |  |
| Tego ® Dispers 670[2] | 0.9 |  |  |  |
| Butyl acetate |  | 4.0 |  | 13.0 |
| Isobutanol | 1.1 |  |  |  |
| Thixatrol ST[3] | 0.3 |  |  |  |
| Kronos 2315[4] | 30.0 |  |  |  |
| Blanc fixe micro[5] | 7.0 |  |  |  |
| DBU[6] | 0.4 |  |  |  |
| Total weight | 100 |  |  |  |
| Coating material solids | 80.0% |  |  |  |

[1]Tego Airex 900 is a deaerating agent from Evonik Industries AG
[2]Tego Dispers 670 is a dispersing additive from Evonik Industries AG
[3]Thixatrol ST is a rheological additive from Elementis
[4]Kronos 2315 is a titanium dioxide from Kronos
[5]Blanc fixe micro is a micronized barium sulphate from Sachtleben
[6]DBU (1,8-diazabicyclo[5.4.0]undec-7-ene) is a catalyst

TABLE 6

|  | Clearcoat 1 | Clearcoat 2 | Clearcoat 3 | Clearcoat 4 |
| --- | --- | --- | --- | --- |
| Example 4 binder (70%) | 100 |  |  |  |
| Example 5 binder (75%) |  | 100 |  |  |
| Example 6 binder (70%) |  |  | 100 |  |
| Example 7 binder (90%) |  |  |  | 100 |
| Total weight | 100 | 100 | 100 | 100 |

The clearcoats were cured using DBU as catalyst (1% catalyst based on resin solids) via hydrolysis/condensation reaction of the silyltrialkoxy groups. The clearcoat materials were drawn down with virtually the same dry film thickness of approximately 50 μm, and were dried for 7 days at room temperature (about 20 to 25° C.). Evaluated subsequently were König pendulum hardnesses, drying recorder drying times, MEK double rubs, and UV stability after 1000 hours of UV-A exposure. The results of testing are summarized in Table 7.

TABLE 7

Clearcoat results

|  | Clearcoat 1 | Clearcoat 2 | Clearcoat 3 | Clearcoat 4 |
| --- | --- | --- | --- | --- |
| Film thickness μm | 47 | 45 | 50 | 48 |
| Initial drying in hours | 3 | 5 | 0.4 | 0.6 |
| Through-drying in hours | 12 | 10 | 10 | 2.5 |
| König pendulum hardness in sec |  |  |  |  |
| after 1 day | 15 | 20 | 56 | 61 |
| after 7 days | 70 | 90 | 80 | 83 |
| MEK double rubs after 7 days | 100 | 50 | 19 | 15 |
| 1000 hours of QUV-A exposure |  |  |  |  |
| Gloss retention in %, 20° angle | 100 | 98 | 100 | 99 |
| ΔE | 1.0 | 1.5 | 1.0 | 1.3 |

The chemical resistance of the white paints from Table 5 was tested. The white paints were drawn down with virtually the same dry film thickness of approximately 50 μm, and were dried for 7 days at room temperature (about 20 to 25° C.). The coatings were subsequently exposed for 8 hours to a cotton pad impregnated with the chemicals listed in Table 8, at room temperature (20 to 25° C.).

TABLE 8

Chemical resistance of white paints

| | White paint 1 | White paint 2 | White paint 3 | White paint 4 |
|---|---|---|---|---|
| Acetic acid (10%) | 1 | 1 | 1 | 1 |
| Hydrochloric acid (10%) | 1 | 1 | 1 | 1 |
| Sulphuric acid (50%) | 1 | 2 | 1 | 1 |
| Sodium hydroxide solution (20%) | 2 | 3 | 3 | 3 |
| Hydraulic oil | 2 | 1 | 1 | 1 |
| Isopropanol | 3 | 3 | 3 | 3 |

Ranking/evaluation:
1 = no change to film surface
2 = slight attack of the film surface
3 = severe attack of the film surface

The invention claimed is:

1. A binder comprising a hydroxy-functional acrylate resin A), an alkoxy- and/or silanol-functional polysiloxane B), and a polyester component comprising one or more dicarboxylic or polycarboxylic acids C) and one or more diols or polyols D), the constituents A) to D) being present condensed with one another in the binder wherein the binder comprises from 10 to 50 wt % of component B) and from 50-90 wt % of a combination of components A), C) and D), based on the solids content of the binder, and wherein the binder has a solids content of from 78 to 99 wt % based on the binder.

2. The binder according to claim 1, wherein the hydroxy-functional acrylate resin A) comprise or have been prepared from:
35 to 50 wt % of aromatic vinyl compounds,
10 to 25 wt % of one or more hydroxyalkyl esters of (meth)acrylic acid,
5 to 20 wt % of one or more alkyl esters of (meth)acrylic acid,
3 to 10 wt % of acrylic acid and/or methacrylic acid, and
12 to 30 wt % of a glycidyl ester of a saturated aliphatic monocarboxylic acid having 9-12 C atoms which is branched on the alpha carbon atom, based in each case on the total weight of component A).

3. The binder according to claim 1, wherein the molar mass Mn of component A) are in the range from 900 to 4000 g/mol.

4. The binder according to claim 1, wherein component B) comprises non-linear, branched, alkoxy-functional and/or silanol-functional polysiloxanes of the general formula 1,

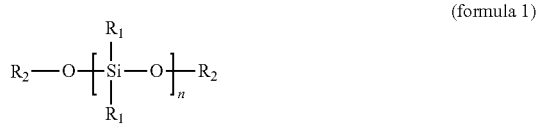

(formula 1)

in which $R_1$ independently at each occurrence are alkyl, aryl or alkoxy groups, hydroxyl or $-OSi(R_3)_3$ groups, where $R_3$ independently at each occurrence may be alkyl, aryl or alkoxy groups, hydroxyl or $-OSi(R_3)_3$ groups,
and where $R_2$ independently at each occurrence may be hydrogen, alkyl groups or aryl groups, and n is >1.

5. The binder according to claim 1, wherein aromatic, aliphatic or cycloaliphatic dicarboxylic or polycarboxylic acids are used as component C).

6. The binder according to claim 1, wherein the diols or polyols of D) are selected from the group consisting of ethylene glycol, propanediols, butane-1,4-diol, hexane-1,6-diol, neopentyl glycol, trimethylolpropane, pentaerythritol, ditrimethylolpropane, perhydrobisphenol A, dimethylolcyclohexane and 3(4),8(9)-dihydroxymethyltricyclo[5.2.1.02,6]decane (TCD Alcohol DM).

7. The binder according to claim 1, wherein the alkoxy- and/or silanol-functional polysiloxane B) has a molecular weight of between 300 and 5100 g/mol and the alkoxy or silanol content of the alkoxy- and/or silanol-functional polysiloxane B) is between 5 and 30 wt %.

8. The binder according to claim 1, wherein the weight ratio of component A) to the polyester constituent comprising components C) and D) is 1:9 to 9:1.

9. A process for preparing binders according to claim 1, in which a hydroxy-functional acrylate resin A), an alkoxy- and/or silanol-functional polysiloxane B), one or more dicarboxylic or polycarboxylic acids C) and one or more diols or polyols D) are reacted with one another via a polycondensation.

10. The process according to claim 9, wherein an esterification catalyst is used in the polycondensation reaction of components A) to D).

11. The binder according to claim 1, wherein the binders are reacted with di- or polyisocyanates, isocyanatosilanes and/or aminosilanes.

12. A method to make a coating comprising applying the binder according to claim 1 to a paint.

13. A coating system comprising a binder according to claim 1.

14. The coating system according to claim 13, wherein the coatings are 1- or 2-component coatings.

15. The binder according to claim 2, wherein the molar masses Mn of component A) are in the range from 900 to 4000 g/mol.

16. The binder according to claim 2, wherein component B) comprises non-linear, branched, alkoxy-functional and/or silanol-functional polysiloxanes of the general formula 1,

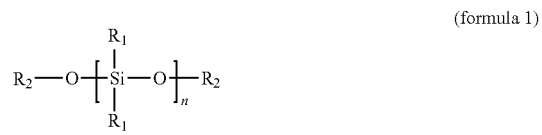

(formula 1)

in which $R_1$ independently at each occurrence are alkyl, aryl or alkoxy groups, hydroxyl or $-OSi(R_3)_3$ groups, where $R_3$ independently at each occurrence may be alkyl, aryl or alkoxy groups, hydroxyl or $-OSi(R_3)_3$ groups,
and where $R_2$ independently at each occurrence may be hydrogen, alkyl groups or aryl groups, and n is >1.

17. The binder according to claim 2, wherein aromatic, aliphatic or cycloaliphatic dicarboxylic or polycarboxylic acids and are used as component C).

18. The binder according to claim 2, wherein the diols or polyols of D) are selected from the group consisting of ethylene glycol, propanediols, butane-1,4-diol, hexane-1,6-diol, neopentyl glycol, trimethylolpropane, pentaerythritol, ditrimethylolpropane, perhydrobisphenol A, dimethylolcyclohexane and 3(4),8(9)-dihydroxymethyltricyclo[5.2.1.0²,⁶]decane (TCD Alcohol DM).

19. The binder according to claim 3, wherein aromatic, aliphatic or cycloaliphatic dicarboxylic or polycarboxylic acids and are used as component C).

20. The binder according to claim 1, having a solids content of from 80 to 90 wt % based on the binder.

* * * * *